United States Patent [19]

Redlich

[11] Patent Number: 4,866,378
[45] Date of Patent: Sep. 12, 1989

[54] DISPLACEMENT TRANSDUCER WITH OPPOSED COILS FOR IMPROVED LINEARITY AND TEMPERATURE COMPENSATION

[75] Inventor: Robert W. Redlich, Athens, Ohio
[73] Assignee: Sunpower, Inc., Athens, Ohio
[21] Appl. No.: 146,823
[22] Filed: Jan. 22, 1988
[51] Int. Cl.$^4$ .............. G01B 7/14; G08C 19/12; G08C 19/02; H01F 21/02
[52] U.S. Cl. .................. 324/208; 324/225; 336/45; 340/870.31
[58] Field of Search .............. 324/225, 207, 208; 336/30, 45, 130, 136; 340/870.31, 870.32, 870.33, 870.34, 870.35, 870.36

[56] References Cited
U.S. PATENT DOCUMENTS 3,218,591 11/1965 Caruthers ..................... 336/136
3,691,243 6/1976 Schulz ........................ 336/130
4,406,999 9/1983 Ward .......................... 336/45
4,667,158 5/1987 Redlich ....................... 324/207

Primary Examiner—Reinhard J. Eisenzopf
Assistant Examiner—Walter E. Snow
Attorney, Agent, or Firm—Frank H. Foster

[57] ABSTRACT

The relative displacement of two bodies is measured by moving an electrically conducting, non-ferromagnetic wall means in proportion to the relative movement of the bodies in order to increase its overlapping, telescoping relationship to a first current conducting coil while simultaneously decreasing its overlapping, telescoping relationship to a second current conducting coil. Each of the coils are excited with an AC signal at a frequency which is at least high enough that the skin depth of the wall means is less than the physical depth of the wall means. A signal is detected which is proportional to the difference in the amplitude of the voltages across the two coils which results in improved sensitivity while improving linearity and substantially reducing temperature dependence.

9 Claims, 3 Drawing Sheets

DISPLACEMENT TRANSDUCER WITH OPPOSED COILS FOR IMPROVED LINEARITY AND TEMPERATURE COMPENSATION

TECHNICAL FIELD

This invention relates generally to an improvement of a displacement transducer of the type having a coil and an electrically conducting, non-ferromagnetic wall, moving in telescoping relation with the coil and excited by a signal of a sufficiently high frequency that skin effect in the wall permits wall displacement to vary the reluctance of the coil flux path and thereby vary its inductance, approximately, proportionally to displacement. More particularly, the invention relates to the use of two such coils which are opposed so that their signals are subtracted to reduce non-linearity, to increase sensitivity and, most important, to achieve a displacement transducer having an inherent null output position that is unaffected by temperature.

BACKGROUND ART

A linear displacement transducer of this type is shown in my previous U.S. Pat. No. 4,667,158 and is illustrated in FIG. 1. The transducer is a helical coil 2 of an electrical conductor wound at a uniform pitch on a cylindrical, thin-walled tube or bobbin 1 of an electrical insulator or a poor conductor such as stainless steel. Preferably, the tube has suitable properties for use as a dry bearing surface, for example Teflon. The helical coil 2 is fixed to the first of two relatively movable bodies for which the relative displacement is to be measured.

A non-ferromagnetic, electrically conducting rod or preferably a tube forms a core 3 which is slidable within the bobbin 1. It is made, for example, of aluminum or copper and is fixed to the second of the two relatively moving bodies.

Preferably the coil is surrounded by a low and constant reluctance path so that change in coil inductance with respect to core 3 movement is maximized. This is preferably accomplished by positioning a material, such as ferrite 5, having a high magnetic permeability, but low electrical conductivity surrounding the coil. This material provides the desired low magnetic reluctance while not permitting the formation of significant eddy currents and not exhibiting a substantial skin effect.

Preferably this high permeability, low conductivity material is itself surrounded with a tubular shield 4 of high electrical conductivity to confine the field of the coil to the ferrite 5 and the skin effect layer of the shield 4 and to prevent external fields from linking with the coil 2. The shield 4 confines the magnetic flux generated by the current in the coil 2 and shields it from stray fields over a wide frequency range. It is preferably made of a material having both high electrical conductivity and high magnetic permeability, such as soft iron or low carbon steel.

An AC electrical energy source 6 and a detector circuit means 7, preferably in the form of a bridge circuit, are electrically connected to the coil 2. The AC source 6 operates at a frequency, preferably in the range of 50–200 Khz, which may be designated a carrier frequency $f_c$. An important key to the efficient and effective operation of a transducer of this type is that $f_c$ be high enough that the skin depth in the core 3 is substantially less than the radius of the core and less than the thickness of the wall of the tube.

The source 6 drives the coil through a resistor 8 which has a resistance which is much greater than the inductive reactance of the coil and its associated structures so that effectively the transducer is driven by a current source. Therefore, the voltage across the transducer coil 5 is approximately $(V/R)*(2pi\, f_c L)$.

The detector circuit 7 detects a signal at an AM detector 9 which is proportional to the inductance of the coil 2 and its associated structures. The coil voltage is proportional to coil inductance, which in turn is proportional to the displacement of the core 3.

In the operation of the basic concept of the displacement measurement apparatus of FIG. 1, the AC source 6 excites the bridge circuit, including the transducer coil 2 in one of its branches. Because of the skin effect at the frequency at which the AC source 6 is operating, magnetic fields in the core 3 are confined to a thin layer approximately equal to the sum of the skin depth in the core material which is typically on the order of 0.25 millimeters thick plus the spacing from the exterior of the core 3 to the interior of the coil 2. Because the skin depth is considerably less than the radius of the core, the magnetic flux is confined to a path in the region of the core 3 which has a considerably smaller cross-sectional area than the flux path where there is no core 3. Since reluctance is inversely proportional to the cross-sectional area of the flux path, the core 3 has the effect of substantially increasing the reluctance and therefore substantially reducing the magnetic flux in the region of the core. With the core 3 partially inserted in the coil 2 of the transducer, the interior of the coil 2 can be divided into the region occupied by the core 3 where magnetic flux is low, and the region unoccupied by the core where magnetic flux is relatively high compared to the core region. Therefore, the flux linkages of the coil are substantially reduced as a result of the insertion of the core and are reduced in proportion of the extent of the insertion of the core within the coil 2. This, in turn, proportionally reduces the self inductance of the coil 2. Thus, the movable core varies the self inductance and the impedance and therefore varies the voltage across the transducer in proportion to its displacement.

While a great variety of detector circuits are known to those skilled in the art for detecting a signal which is proportional to the changes in coil inductance or voltage, the detector circuit of FIG. 1 operates well. A bridge is designed to be brought into AC amplitude balance by adjustable resistor 10 when the core 3 is centered within the coil 2. The AC source 6 is a signal at a frequency $f_c$. The amplitude of the transducer signal at frequency $f_c$ at the node 11 of the bridge proportional to the displacement of the core 3. The amplitude of the balance signal at frequency $f_c$ at the opposite node 12 is adjusted so that it is equal to the amplitude of the transducer signal at node 11 when the core 3 is centered within the coil 2. A detector circuit means comprising two AM detectors 9A and 9B and a differential amplifier 14 are provided to detect the difference between the modulation amplitudes at the nodes 11 and 12.

The displacement of the core 3 is effectively providing an amplitude modulated signal at the terminal 11, the amplitude of which is proportional to displacement of the core 3 and may be detected by the AM detector 9B to provide an output signal which is directly proportional to the displacement of the core 3. The balance signal at node 12 is detected by an AM detector circuit 9A. The output signals from the two AM detectors 9A and 9B are applied to a differential amplifier 14, the output of which provides a signal $V_{out}$ which is proportional to the displacement of the core 3. Further details of the basic concept are described in more detail in my above cited U.S. Patent.

One problem with transducers of this type is that they exhibit some temperature dependence, that is the output voltage is a function of their operating temperature. The principal cause of the temperature dependence is the temperature dependence of the skin depth. Since the transducer of the present invention utilizes the skin effect to confine the flux to a considerably smaller cross-sectional area of the flux path in the region of the movable core, changes in temperature, which cause changes in the skin depth, result in variations in the cross-sectional area of the flux path between the coil and the wall or core. This changes the reluctance of the flux path which causes changes in the flux resulting ultimately in changes in the inductance in the coil as a function of temperature. In the bridge circuit of FIG. 1, the balancing voltage at node 11 is not affected by temperature in the same way as the transducer voltage at node 12. Therefore, the balance of the bridge is temperature dependent and distance x at which bridge balance occurs is temperature dependent.

Yet another problem with a transducer constructed as described above is that its inductance and therefore the output voltage of the detector means is not exactly proportional to the relative displacement X shown in FIG. 1 of the core 3 into the coil 2. The relative displacement X is measured as the position of the interior end 18 of the core 3 with respect to the right or entry end of the coil 2. As a result, a non-linear relationship exists for a simple coil illustrated in FIG. 1 in which the rate of change of the output signal from the detector means with respect to a change in the displacement of the core 3 decreases as the displacement X increases. Therefore, the actual transfer function falls increasingly below a straight line, ideal, linear transfer function as X increases. This non-linearity is the result of not only increases in losses as the core displacement increases because the core is relatively lossy, but also the non-uniformity of the flux in the transition region adjacent the interior end of the wall or core 3.

It is therefore an object and feature of the present invention to reduce the non-linearity of the transfer function relating core displacement to the output signal and to achieve a displacement transducer that has an inherent null position that is unaffected by temperature.

A further object and feature of the present invention is to increase the sensitivity of the transducer which operates on the above principles and approximately double that sensitivity.

BRIEF DISCLOSURE OF INVENTION

The invention utilizes a pair of current conducting coils which are both mounted to the first one of the two relatively movable bodies. An electrically conducting, non-ferromagnetic wall means is positioned in telescoping relationship to both of the coils. The wall means is mounted to the second body for axial displacement relative to both of the coils for varying the relative coil/wall means overlap by increasing the overlap with one coil when decreasing the overlap with the other. This simultaneously increases the inductance of one coil and decreases the inductance of the other. An AC electrical energy source is connected to apply an AC signal to each of the coils at a frequency which is at least high enough that the skin depth of the wall means is less than the physical depth of the wall. A detector circuit means is connected to the coils for detecting a signal which is proportional to the difference between the inductances of the two coils. By obtaining the difference signal, the non-linearity of the signals are subtracted from each other and thereby approximately eliminated while the displacement dependent portion of the signals are essentially added and thereby doubled. This results from the fact that the displacement dependent signal from one coil is increased when the displacement dependent signal from the other is decreased. When these are algebraically subtracted, the result is the sum of the absolute value of the amplitudes of the displacement dependent portions of the signals. A null or zero output occurs when the voltages across the two coils are equal. Since these voltages have identical temperature dependence, the relative displacement at which null occurs is independent of temperature.

Figure 1:
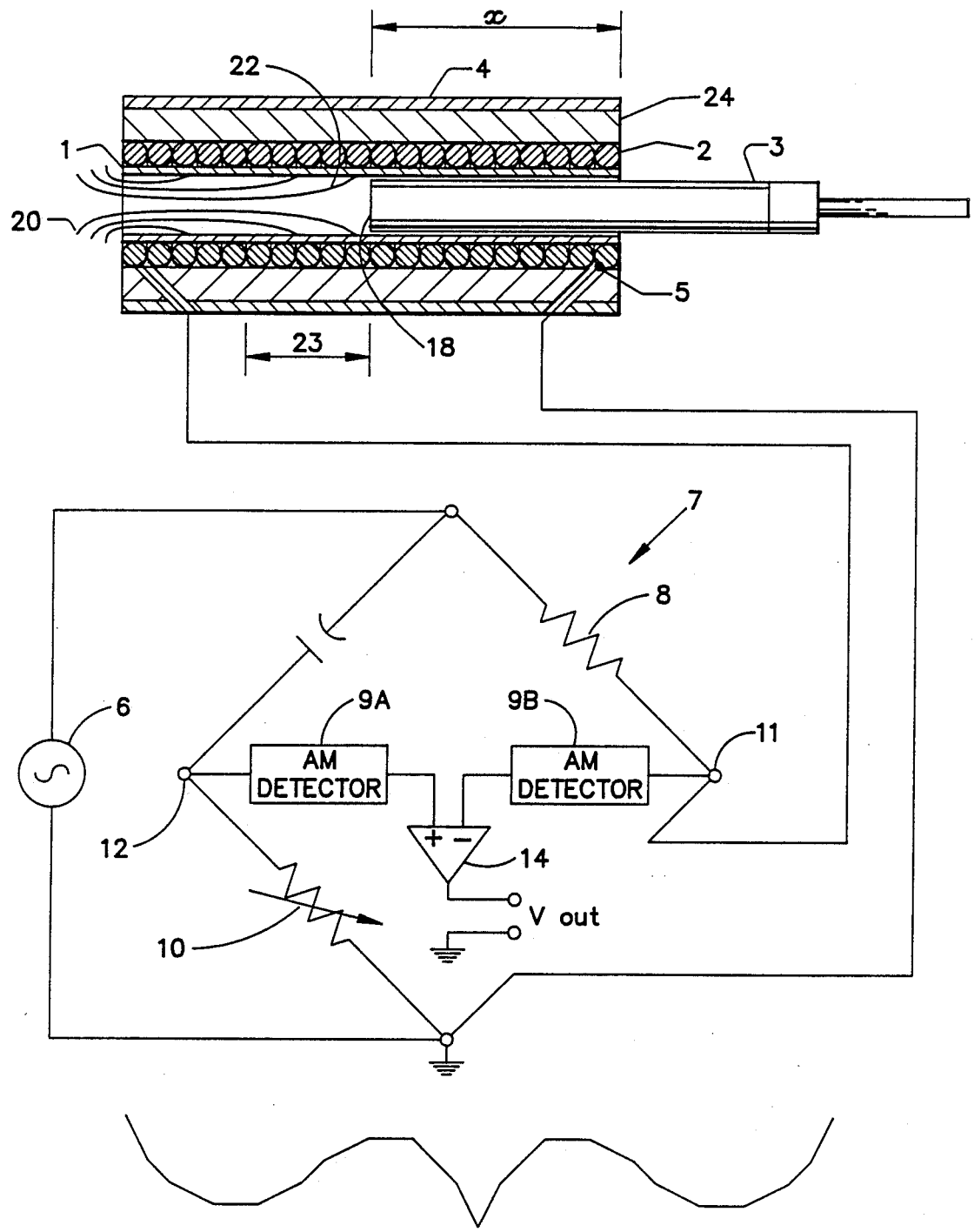
FIG. 1 is a diagrammatic view of my prior art transducer and measuring apparatus illustrated in my prior U.S. Pat. No. 4,667,158.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other circuit elements where such connection is recognized as being equivalent by those skilled in the art.

DETAILED DESCRIPTION

Figure 2:
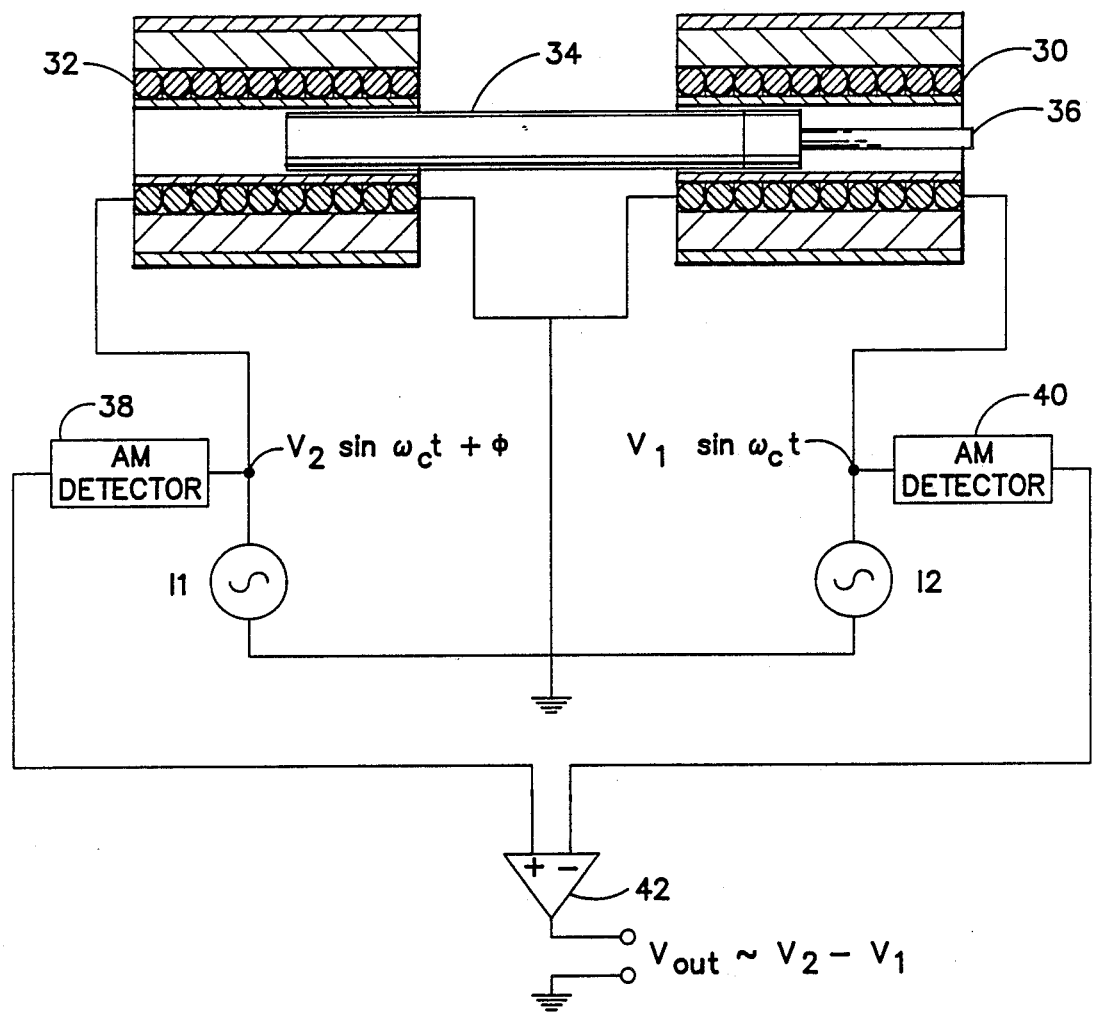
FIG. 2 is a diagrammatic view of the preferred embodiment of the invention.

Referring to FIG. 2, the present invention utilizes a pair of current conducting coils 30 and 32 which are connected to a first one of the two relatively movable bodies for which the relative displacement is to be measured. The coils 30 and 32 are surrounded by low reluctance flux paths and shields of the same type and for the same reasons as those illustrated in FIG. 1. An electrically conducting, non-ferromagnetic wall means, such as a cylindrical core 34, is positioned in telescoping relationship to both of the coils 30 and 32. It is mounted to the second one of the removable bodies, for example by means of a connecting arm 36 which is preferably non-ferromagnetic and non-conducting so as to be relatively electrically inert. The core 34 moves axially with respect to the coils 30 and 32 in a manner which varies the relative coil/core overlap.

For example, as the core 34 moves to the left in FIG. 2, its overlap with coil 32 is increased, while its overlap with coil 30 is decreased. Similarly, as the core 34 is moved to the right, the overlap with coil 30 is increased and the overlap with coil 32 is decreased.

For the reasons stated above in connection with FIG. 1, increasing the overlap with the coil 30 or the coil 32 decreases the inductance of that coil with the reduced overlap. Decreasing the overlap increases the inductance. Thus, each of the two coils 30 and 32 operates individually with respect to the core 34 in the manner of the core 2 of FIG. 1.

A pair of electrical energy sources 11 and 12, which are preferably constant current sources, are connected to apply an AC signal to each of the coils. The AC signal is at a frequency which is at least high enough that the skin depth of the wall means is less than the physical depth of the wall for the reasons described in connection with the embodiment of FIG. 1.

The detector circuit means is connected to the coils 30 and 32 for detecting a signal which is proportional to the difference between the inductances of the two coils. In particular, the preferred detector circuit comprises a first AM detector 38 connected to the coil 32, and a second AM detector 40 connected to the coil 30. The outputs of these two AM detectors are then connected to a differential amplifier 42, the output of which provides the output voltage which is proportional to the displacement of the core 34.

Preferably, the two coils 30 and 32 have substantially identical, electrical and thermoelectrical characteristics, although an equivalent result can be accomplished by other means. Since the characteristics are identical, the circuit of FIG. 2 is completely symmetrical and an increase in the inductance of one coil is accompanied with a decrease in the inductance of the other, the subtracting of the voltage across one from the voltage across the other results in the summation of the absolute values of the portion of the voltage across each coil which is a function of displacement. However, since temperature will have an identical effect in each coil, a subtraction of the signals results in a subtraction of the temperature errors if the two signals are equal at a particular temperature. Thus, a signal appears at the input to AM detector 40 which may be represented as $V_1 \sin w_c t$, while the signal at the input to detector 38 may be represented as $V_2 \sin w_c t + \phi$. The $\phi$ represents a phase difference between the two signals. Both $V_1$ and $V_2$ represent the amplitude at the carrier frequency and therefore are each a function of the displacement of the core 34. These amplitudes $V_1$ and $V_2$ are detected and the phase difference problems are eliminated by the use of separate AM detectors 38 and 40, to provide output signals from the AM detectors which are proportional to the inductance of the respective coils. These detected amplitudes are applied to the differential amplifier 42 to provide an output signal which is proportional to $V_2 - V_1$ and therefore is proportional to the displacement of the core 34.

Figure 3:
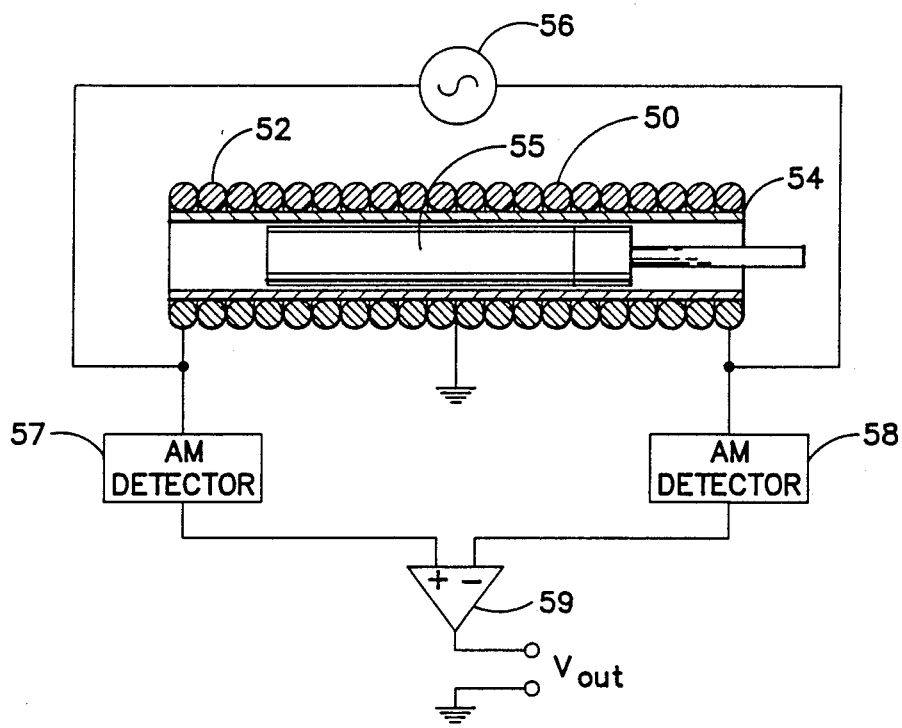
FIG. 3 is a diagrammatic view of an alternative embodiment of the invention.

FIG. 3 illustrates a different embodiment of the invention in which the coils 50 and 52 are wound on a single, common coil formed bobbin 54 and are adjacent each other. A constant current source 56 is connected across these coils as illustrated. The detector circuit means consisting of AM detectors 57 and 58 and differential amplifier 59 is identical to the detector circuit of FIG. 1.

FIG. 3 illustrates one of several alternative embodiments of the invention which may be created. The two coils may be wound on the same or different cores and may be coaxial or not. Ordinarily there is no flux linkage between the coils even when they are adjacent because the core essentially isolates the two coils. The windings may be wound in the same or opposite directions.

It is preferred that the coils be constructed so that they have identical electrical and thermoelectrical characteristics so that the output signal $V_{out}$ is zero when the core 34 or 55 is in the central position. In this manner, the polarity of the output signal $V_{out}$ represents the direction of displacement from the zero center position and the amplitude of $V_{out}$ represents the displacement.

Figure 4:
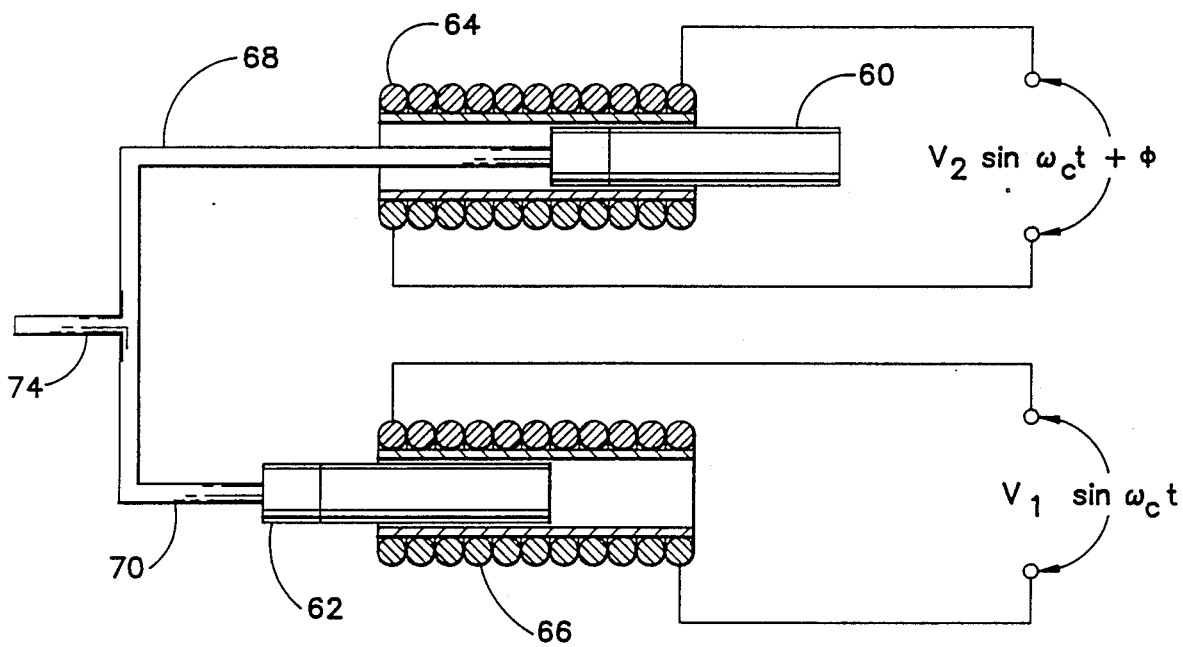
FIG. 4 is a diagrammatic view of yet another alternative embodiment of the invention.

FIG. 4 represents yet another embodiment in which the wall means comprises a pair of wall members, such as core members 60 and 62, each one in overlapping relation to a different one of two coils 64 and 66. The cores 60 and 62 are physically connected to each other by preferably electrically inert actuator rods 68 and 70 which are in turn connected to each other and to an actuator rod 74 which is connected to one of the two relatively moving bodies, the coils being connected to the other.

The terms "overlap" or "in overlapping relationship" are chosen to describe the relationship between the wall members and the coil regardless of which is in telescopic relationship within the other. The embodiments of the present invention may be constructed with the core outside or inside the coil in telescoping, overlapping relationship.

While certain preferred embodiments of the present invention have been disclosed in detail, it is to be understood that various modifications may be adopted without departing from the spirit of the invention or scope of the following claims.

I claim:

1. A displacement measuring apparatus comprising:
   (a) a pair of current conducting coils connected to a first one of two relatively movable bodies, a first terminal of each coil connected to a common ground;
   (b) an electrically conducting, non-ferromagnetic wall means in telescoping relationship to both of the coils and mounted to the second body for axial displacement relative to both of the coils for varying the relative coil/wall means overlap by increasing the overlap with one coil when decreasing the overlap with the other and thereby simultaneously increasing the inductance of one coil and decreasing the inductance of the other coil;
   (c) an AC electrical energy source connected to apply an AC signal to each of said coils at a frequency which is at least high enough that the skin depth of the wall means is less than the physical depth of the wall means, the source comprising a pair of substantially constant current sources each connected to the second terminal of a different one of said coils and to the common ground; and
   (d) a detector circuit means connected to the coils for detecting a signal which is proportional to the difference between the inductances of the two coils, the detector circuit means comprising a pair of amplitude modulation demodulators, the input of each demodulator connected to the second terminal of a different one of the coils and a differential amplifier having its inputs connected to the output of each demodulator.

2. An apparatus in accordance with claim 1 wherein said coils have substantially identical electrical and thermoelectrical characteristics.

3. An apparatus in accordance with claim 1 wherein said coils are coaxial.

4. An apparatus in accordance with claim 3 wherein the wall means comprises a single tubular wall in overlapping relation with both coils.

5. An apparatus in accordance with claim 4 wherein said coils are wound upon a common coil form bobbin.

6. An apparatus in accordance with claim 5 wherein said coils have substantially identical electrical and thermoelectrical characteristics.

7. An apparatus in accordance with claim 1, said wall means comprises a pair of wall members each in overlapping relation to a different one of the coils.

8. An apparatus in accordance with claim 7 wherein said coils are aligned along parallel axes and said wall members are physically connected to the second body.

9. An apparatus in accordance with claim 8 wherein each of said wall members comprises a tube.

* * * * *